United States Patent

Breault et al.

[19]

[11] Patent Number: 5,837,395
[45] Date of Patent: Nov. 17, 1998

[54] CORROSION RESISTANT FUEL CELL ASSEMBLY

[75] Inventors: Richard D. Breault, Coventry; Robert R. Fredley; Glenn W. Scheffler, both of Tolland, all of Conn.

[73] Assignee: International Fuel Cells, South Windsor, Conn.

[21] Appl. No.: 576,606

[22] Filed: Dec. 21, 1995

[51] Int. Cl.$^6$ .................................................. H01M 2/08
[52] U.S. Cl. ................................................ 429/35; 429/36
[58] Field of Search .............................. 429/35, 36, 18, 429/34, 40

[56] References Cited

U.S. PATENT DOCUMENTS

| | | | |
|---|---|---|---|
| 4,555,324 | 11/1985 | Ueno et al. | 429/36 X |
| 4,652,502 | 3/1987 | Breault et al. | 429/13 |
| 4,781,727 | 11/1988 | Mitsuda et al. | 429/35 X |
| 5,187,025 | 2/1993 | Kelland et al. | 429/36 X |
| 5,270,132 | 12/1993 | Breault et al. | 429/35 |

*Primary Examiner*—Anthony Skapars
*Attorney, Agent, or Firm*—Alan C. Cohen

[57] ABSTRACT

The present invention discloses a corrosion resistant fuel cell in which an ion impermeable protective layer is positioned over at least a portion of the noncatalyzed carbon based components. This layer prevents reactant ions or molecules form reaching localized high potential areas of these components and corroding the carbon material.

5 Claims, 4 Drawing Sheets

CORROSION RESISTANT FUEL CELL ASSEMBLY

TECHNICAL FIELD

The technical field to which this invention pertains is a fuel cell and particularly fuel cell stacks having corrosion problems.

BACKGROUND OF THE INVENTION

Fuel cells and fuel cell stacks have been used for many years to produce electricity. The fuel cell stack is composed of a series of fuel cells stacked one on top of the other and electrically connected. A typical fuel cell comprises an anode electrode and a cathode electrode which are positioned on opposite surfaces of an electrolyte material. Typically, the electrolyte material is a liquid such as phosphoric acid which is retained in a fibrous or particulate matrix. The electrodes are formed from a porous carbon or graphite material into a flat sheet. Onto one surface of the electrode is placed a catalyst which is in contact with the electrolyte when the cell is assembled. A reactant gas is introduced onto the opposite surface of the electrode and migrates through the porous substrate to the catalyst/electrolyte interface where it reacts.

Additionally, because of the porosity of the electrode substrate at least a portion of one of the substrates may serve as an electrolyte reservoir plate, that is, it may accommodate in its pores, at the time of assembly, a predetermined amount of replenishment electrolyte. This electrolyte is then used during operation of the fuel cell device to automatically replenish any electrolyte that may be lost due to various reasons.

Typically the reactant gases used (hydrogen and oxygen) in the fuel cell process are under pressure must be kept separated or combustion may occur. Various means are implemented to maintain the separation of the gases as well as prevent the loss of the electrolyte. One of these devices is the formation of an edge seal about the outer region of the electrode substrate and other fuel cell components which may be used, such as an electrolyte reservoir or flow field. These edge regions may be in the form of a densified area material, an impregnant or a wet seal. All of which are common structures in the fuel cell industry.

However, experience has indicated that under certain circumstances, the carbon based material of the substrate, and particularly the cathode, may be subject to corrosion at the noncatalyzed edge regions. This is attributable not only to the fact that oxygen and water are or may be present at or near the edge region, but also that mixed potentials resulting from the electrochemical reaction does or may exist locally in these areas.

Such corrosion or oxidation of the carbon substrate may lead to mechanical failure, cross over and 'ultimate failure' of the cell. In the past it has been suggested that this area be kept free of liquid materials such as electrolyte and or water. It was proposed to impregnate the edge region with a non-wetable material in these regions (see commonly assigned U.S. Pat. No. 5,270,132). Although this may solve some of the problems, it has not satisfactorily limited the corrosion.

Therefore, what is needed in this art is an improved fuel cell having reduced susceptibility for corrosion of fuel cell carbon based components.

DISCLOSURE OF THE INVENTION

The present invention is directed toward a corrosion resistant fuel cell having an electrolyte positioned between an anode electrode and a cathode electrode. Each electrode having a catalytic surface facing the electrolyte, wherein the catalytic surface contains a non catalyzed edge region and where an ion impermeable layer is positioned between the edge region of the anode and the cathode.

Another aspect of the invention is where an ion impermeable layer is positioned over a portion of the outboard edge of either an anode or a cathode electrode.

Another aspect of the invention is where the ion impermeable layer is positioned between the anode and the cathode noncatalyzed edge regions, overlaps onto the outboard edge region and further overlaps onto the second surface of either the anode, the cathode, or both.

Yet another aspect of the invention is a fuel cell in which the edge region of the fuel cell components which are superimposed above the cathode flow field inlet and outlet and are perpendicular to the flow of oxidant through the flow field are narrower than the edge regions of such components which are parallel to the flow field of the cathode oxidant.

BEST MODE FOR CARRYING OUT THE INVENTION

Figure 2:
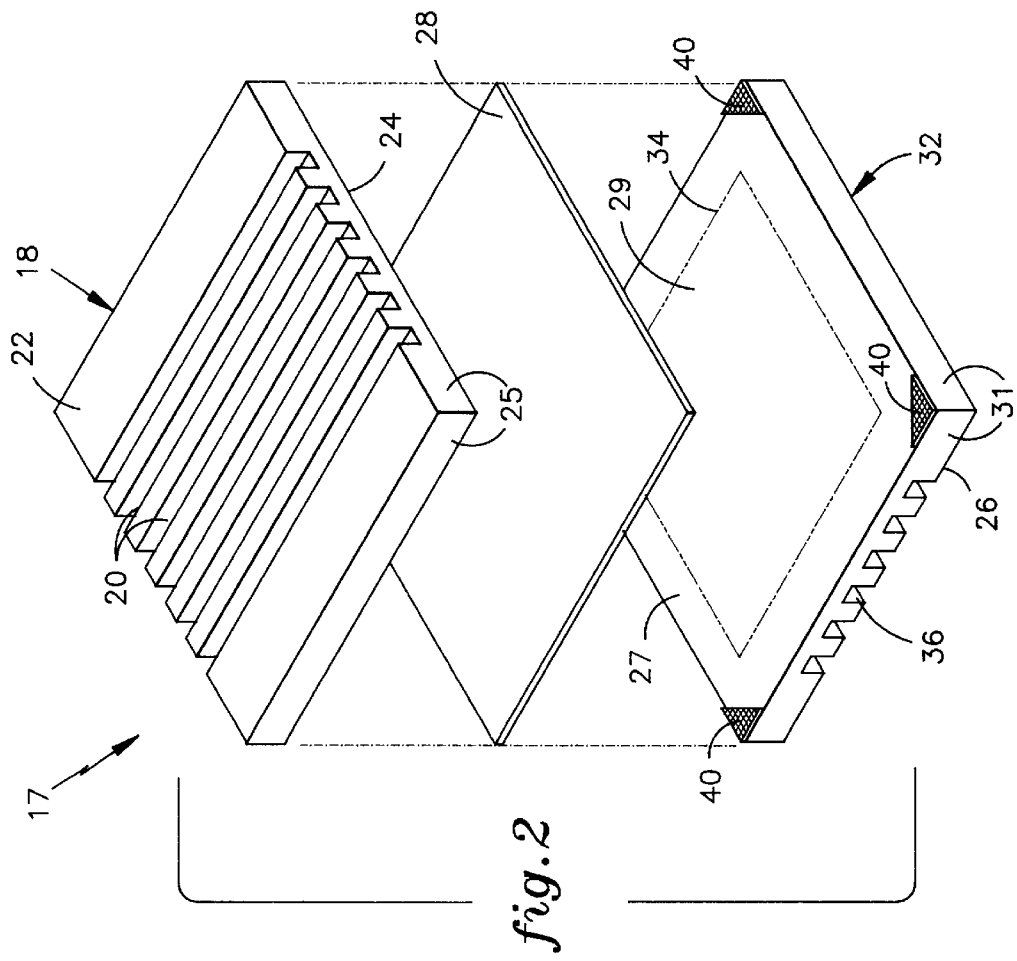
FIG. 2 is an exploded view of one embodiment of the present invention.

Referring now to the drawings which are intended to be exemplary embodiments to further illustrate the invention and are not intended to be limiting.

Figure 1:
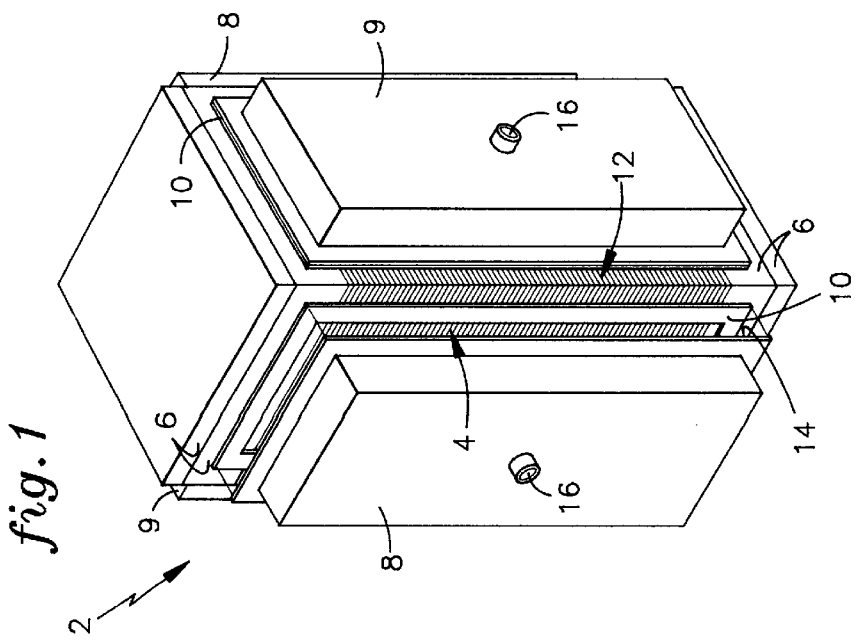
FIG. 1 is an oblique view of a fuel cell stack of the prior art.

FIG. 1 depicts a typical fuel cell stack in which a fuel cell stack 2 having a plurality of fuel cells 4 each of which comprises an anode and a cathode electrode positioned on opposing surfaces of the electrolyte. The stack having end plates 6 to support the stack assembly and a fuel gas manifolds 8 and an oxidant gas manifold 9, for directing either fuel or oxidant to the anode or cathode respectively, are positioned on adjacent sides of the fuel cells 4 of the stack 2. To prevent the escape of either the oxidant or the fuel, a seal 10 is positioned at the interface between the edge of the manifold 8 and 9, and the fuel cell stack 2. Often times there is a portion of the fuel cell 4, typically the corners 12, which are not included in the manifold 8 but are exposed to the atmosphere surrounding the fuel cell stack. These corners 12 include the non-catalyzed edge region of the electrodes.

FIG. 2 shows an exploded view of a single fuel cell 17 of the fuel cell stack 2 of FIG. 1. Also included in this figure is one embodiment of the present invention. The fuel cell 17 comprises an anode electrode 18 and the cathode electrode 32 positioned on opposite sides of an electrolyte material 28. The anode 18 having a fuel gas flow field 20, which is in fluid communication with the fuel manifold 8 and which is positioned on a first major surface 22 of the anode 18 while a catalytically active material, which is in contact with the electrolyte is on a second, opposing major surface 24 (the second major surface having the catalytically active material is not visible in this view, however it is defined similarly to that of the cathode electrode, in which there is a central catalytically active area having a periphery or edge region of noncatalyzed substrate which is described below). The anode further having a vertical outboard edge 25 which is also uncatalyzed and which is the surface extending perpendicularly between the two major surfaces.

The cathode 32, as mentioned above, also has two major surfaces and a vertical outboard edge 31. The cathode has a first major surface 26 which is in flow communication with the oxidant manifold 9 and which is opposite the electrolyte layer 28. A second major surface 29 contains a catalyzed region 34 which faces the anode 18 and is in contact with the electrolyte material 28. The second major surface 34, as with the anode 18, is further defined by a non catalyzed periphery or edge region 27.

Figure 7:
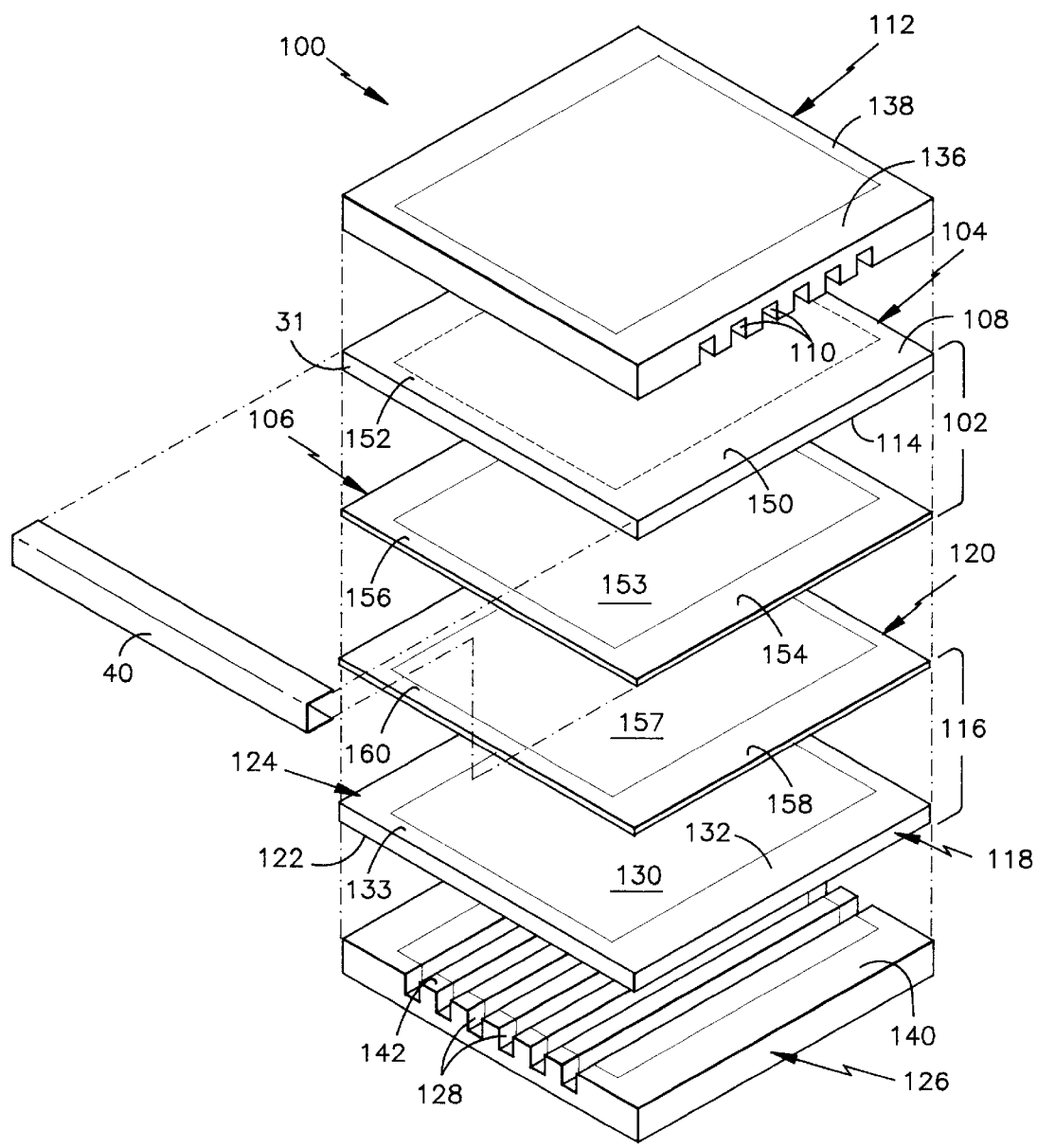
FIG. 7 is an exploded view of yet another embodiment of the present invention depicting the narrow non-catalytic edge seal on the anode.

In addition this figure also discloses one embodiment of the present invention in which a portion of the edge region 27 has positioned between it and its superjacent counterpart edge regions of the anode, an ion impermeable layer 40. In this particular embodiment only the corners of the cathode edge region are covered, however, it is contemplated, and will be shown later in this specification, that such ion impermeable layers may be placed superjacent to any portion of the noncatalyzed region of the anode or cathode to limit migration or contact of such noncatalyzed region from reactant gases or ions of such reactant gases. Further, it should be noted that although it is shown that the ion impermeable layer is positioned directly on the surface of the edge region of the electrode, it could easily be positioned anywhere between the two electrode edge regions. For example in those fuel cells having a split electrolyte (or electrolyte on the surface of each catalyzed electrode surface) the ion impermeable layer could be positioned between these two electrolyte layers. One example of this is shown in FIG. 7 below. It should further be noted that although the position of the ion impermeable layer may be shown to positioned on or near the cathode edge region, it is contemplated, and in many instances preferred that it be positioned on or near the anode electrode edge region instead.

Figure 3:
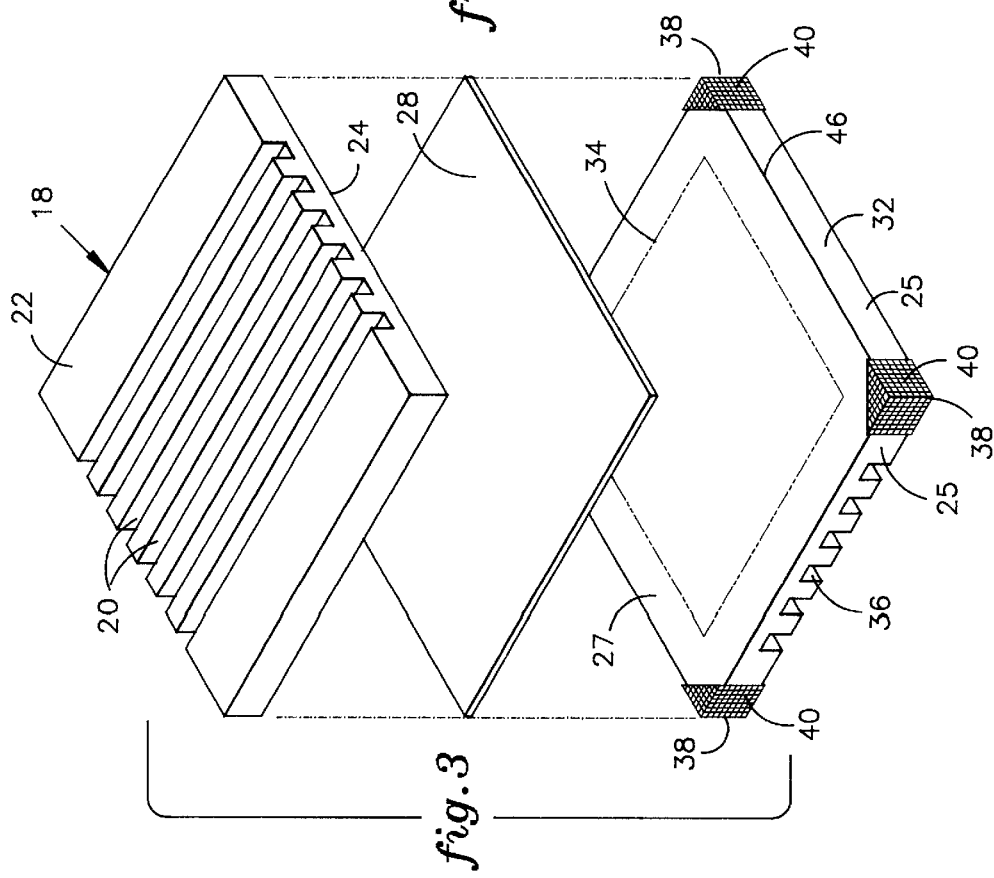
FIG. 3 is an exploded view of a second embodiment of the present invention.

FIG. 3 depicts an embodiment of the present invention and again is an exploded view of a fuel cell having a cathode electrode 32 and an anode electrode 18 positioned on opposite sides of an electrolyte 28. In this embodiment an ion impermeable layer 40 is positioned over the vertical outboard edge 25 of the corner of the cathode 38 and overlaps onto the second major surface 34 of the cathode covering a portion of the edge region 27 thereof. This layer will provide protection of the outboard edge from contact and subsequent migration of oxygen into the edge region of the cell component, thereby reducing the likelihood of corrosion occurring.

Figure 4:
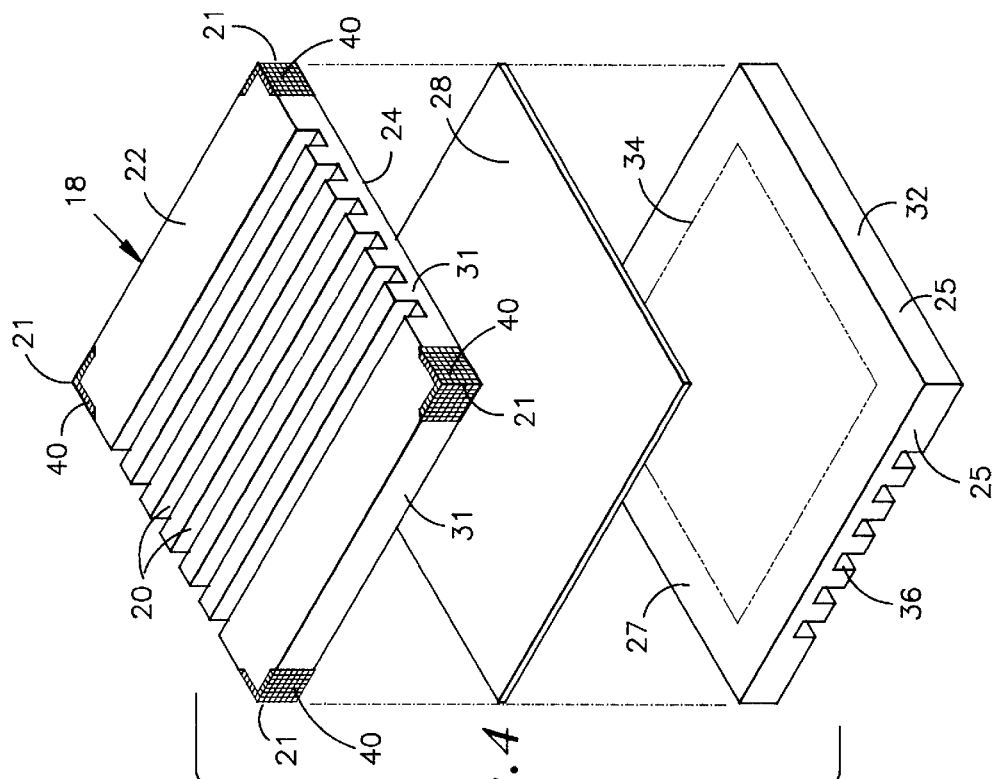
FIG. 4 is an exploded view of a third embodiment of the present invention.

FIG. 4 depicts yet another embodiment of the present invention of the same fuel cell as shown in FIGS. 3, except that the ion impermeable layer 40 is positioned over the vertical outboard edge 31 of the anode instead of the vertical edge 25 of the cathode and less of the ion impermeable layer 40 is positioned between the edge region of the anode and cathode than depicted in the embodiment of FIG. 3.

Figure 5:
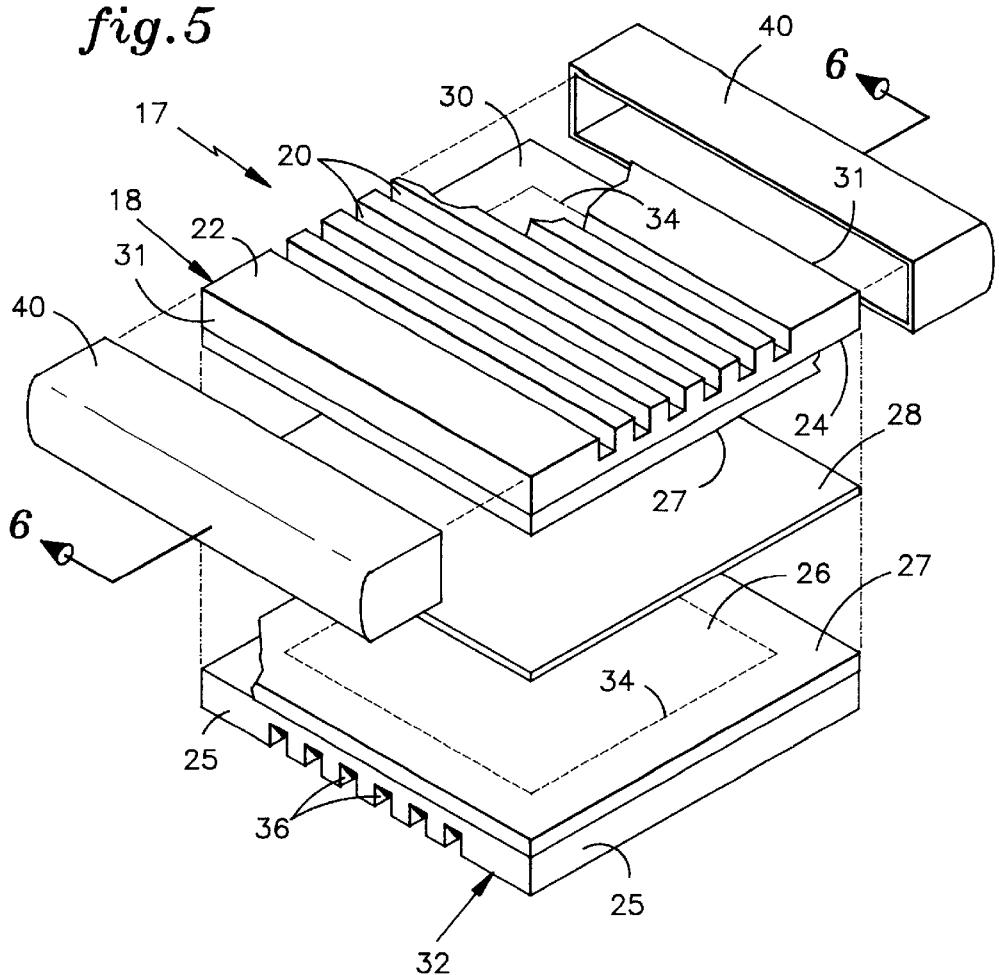
FIG. 5 is an exploded view of a fourth embodiment of the present invention.
Figure 6:
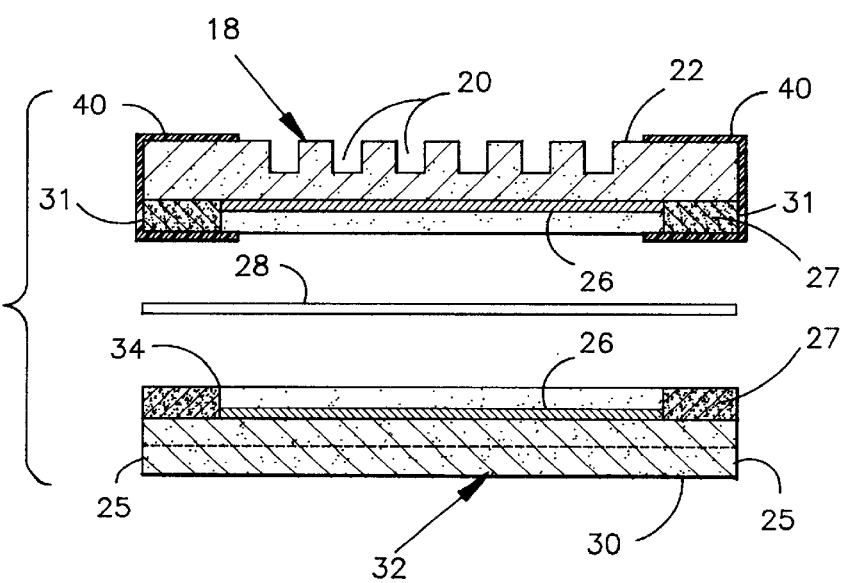
FIG. 6 is a cross-sectional view of that embodiment set forth in FIG. 5.

FIG. 5 depicts a fuel cell of the same design as in the previous figures however, in this depiction the entire vertical edge 31 and much of the edge region 27 of the anode 18 which is parallel to the flow field 20 is covered by the ion impermeable layer 40. A cross sectional view shown in FIG. 6, shows the ion impermeable layer 40 positioned over the edge region 27 and the vertical outboard edge 31. Where this design is adopted, it should be noted that the layer is to be positioned so as not to disrupt the flow of gases through the inlet 36 and outlet (not shown) of the gas flow field. Therefore it is unlikely that such layers will cover the vertical outboard edge 25 and the cathode edge regions 27 running perpendicular to the flow of oxidant gas.

The fuel cell designs of the previous figures incorporate an integrated flow field formed in the first major surfaces of the anode and cathode substrates and is one common design for fuel cells. However, this invention works equally as well in those fuel cell designs which have separate flow field components. One such design is depicted in FIG. 7. In this figure the fuel cell 100 has an anode 102 comprised of an anode substrate 104 and an electrolyte layer 106 said electrolyte layer having an edge region 154 and 156 and a central electrolyte containing region 153. The anode substrate having a first major surface 108 which is in fluid contact with the gas flowing through channels 110 of the flow field 112. As is the case with the anodes of the previous design, this anode also has a catalytic layer across its second major surface 114, retaining an uncatalyzed edge region or periphery indicated as 150 and 152. A cathode 116 also comprises a cathode substrate 118 and an electrolyte layer 120 said electrolyte layer having an edge region 158 and 160 and a central electrolyte containing region 157. The cathode substrate 118 having a first major surface 122 and a second major surface 124. The first major surface 122 is in fluid communication with the oxidant flow field 126 having flow channels 128 through which the oxidant is distributed over the first major surface 122. The second major surface 124 of the cathode 116 contains a catalyzed region 130 and a non catalyzed edge region or periphery 132 and 133 similar to that of the anode.

Also the flow fields have edge regions which extend over the noncatalyzed edge regions of the anode and cathode. In this instance they are depicted on the fuel flow field as edge regions 136 and 138 while on the oxidant flow field as edge regions 140 and 142.

Also shown is an ion impermeable layer 40 of the present invention positioned over the vertical outboard edge 31 of the anode edge region which is running perpendicular to the oxidant flow field 126. This edge region is defined in this instance to include the parallel edge region of the electrolyte layer 106 as well. The ion impermeable layer 40 has extension which overlap onto the edge region of the first surface of the anode substrate 108 and also overlap onto the edge region of the surface of the electrolyte layer 106 such that a portion of the ion impermeable layer is positioned between the edge region of the anode and cathode electrode upon assembly. This ion impermeable layer is in the form of a wrap which extends along the anode electrode edge region superjacent to the oxidant gas inlets and outlets edge region of the cathode. As an alternative, the ion impermeable layer could be placed on the cathode electrode edge region instead of the anode region, however, it is preferred that it be positioned on the anode electrode as shown.

Additionally, this drawing shows another aspect of the invention which assists in the corrosion resistance. That is the narrowing of the edge region formed on those edge regions of the fuel cell components which when the fuel cell is assembled will be aligned superjacent to the cathode oxidant inlet and outlet edge regions. As may be seen in FIG.

7, the cathode flow field 126 has an inlet edge region 142 which is narrower than the edge region 140. This narrowing of the edge region is also seen in the other components at those surfaces which coincide with the cathode oxidant flow field inlet and outlet, such as the edge region 138 of the anode flow field 112 and the edge regions of both the anode 102 and the cathode 116 electrodes.

The ion impermeable layer used in this invention may be formed in a number of ways and cover a variety of areas of the different components of the fuel cell. The purpose of the layer is to prevent the migration of electrolyte, hydrogen ions and oxidant molecules to the uncatalyzed electrode substrate areas. It is believed that by isolating these areas, corrosion is slowed or stopped at these locations.

The term electrode as used herein includes those electrodes which comprise a porous carbon or graphite substrate on which is placed a catalyst and which may further include a layer of electrolyte. Therefore it is contemplated that an ion impermeable layer which is positioned between the anode and the cathode could be positioned superjacent to or embedded in the electrolyte layer of the fuel cell, as is shown in the embodiments. However, as shall be seen, it is preferred that in any event, the ion impermeable layer be positioned superjacent to the uncatalyzed edge region between the electrodes or over the vertical outboard edges of the component to be protected.

The ion impermeable layer may be formed from a preformed film or sheet of ion impermeable material such as a fluorocarbon material i.e. Teflon, polytetrafluoroethylene, polytetrafluoroethylene/perfluoroalkyl vinyl ether copolymer (PFA), polyphenylene sulfide or fluoroelastomers such as Fluorel or Viton. Or in the alternative it is contemplated that the layer may be formed from a liquid coating such as a resin which when dried forms the protective layer. All of these materials should be compatible with the environment within the cell, such as having a melt temperature above the operating temperature of the cell stack, unaffected by the acid or alkaline electrolyte used in the cell or the gases used as fuel or oxidants and be electrically nonconductive. In addition, it should have good resistance to cracking in the environment as the introduction of cracks would necessarily compromise the layers ability to perform its desired function.

When using a film or sheet to form the barrier layer it is desirable to have the sheet as thin as possible, compatible with the sheets ability to prevent passage of the hydrogen ions or oxidant molecules and retain its integrity in the environment in which it is used. In the case of the fluorocarbon sheets a thickness of about $10\mu$ to about $100\mu$ is preferred. This will create a sufficient ion impermeable layer, yet not create an application problem or sealing problem where applied.

As for the resin or coatings which may be applied to form the impermeable layer, they should be evenly applied and create the desired ion impermeability when dried or in their final form. Typical thickness for these materials will be about $10\mu$ to about $100\mu$ as well.

The impermeable layer may be placed anywhere that it will impede the flow or passage of the ions or molecules from reaching the high potential areas of the cell. Most preferably this will mean that the layer should be positioned between the edge regions of the anode and cathode electrodes. Typically, these are the regions having high potential and which are very susceptible to corrosion in the presence of these ions or gases. Other areas of corrosion which may benefit from such a layer as well such as the corners or outboard edges of the fuel cell components, particularly in those areas of these components at the air inlet and air exit regions of the flow field or the exposed edges (the nonsealing edges) of the anode and cathode which may be exposed to the environment outside the fuel cell stack.

It has also been found that when the ion impermeable layer is used, corrosion can be further reduced by minimizing the width of the noncatalyzed edge regions which are opposed to or superjacent to the cathode flow filed inlet and outlet as depicted in FIG. 7. Typically, these edge regions have a width in excess of 25 mm. However, it has been found that by reducing the width of the edge region at this location corrosion resistance is improved. Although there is no dimensional criteria for this narrower width, it is believed that the narrower the better, consistent with the edge region being able to perform its original sealing function. Preferably this means that these edge regions should have a width of less than 25 mm. Naturally, any mating or equivalent edge regions of the other components, i.e. anode electrode, flow field etc., would need to have their edge regions similarly narrowed as well.

Where the ion impermeable layer is formed from a sheet of material it may be formed into the desired shape prior to positioning it in the fuel cell. Naturally, where the ion impermeable layer is to be a thin layer positioned between the edge regions of the anode and cathode it may simply be cut to the desired dimensions and then laid in position during assembly and held in position by compression when the cell or stack is assembled. The sheet could also be formed into any number of configurations which would slide over or cover more than one surface, and would have an edge which overlays the edge region between the anode and cathode electrodes. Under these types of constructions the ion impermeable layer would be held in position under compression once the cell is assembled.

In those instances where the ion impermeable layer is to be formed in situ as a liquid, it could be applied by spraying, brushing or dipping and then allowed to dry. The one drawback to this method of application is that it is more likely to result in a layer being less impermeable than the sheet material and therefore extra caution needs to be taken during its manufacture. The use of the proposed ion impermeable layer offers advantages over the prior art. Most significantly, the reduction of the migration of ions and molecules to the high potential areas of the edges of the different component significantly reduces the opportunity for corrosion. Secondly, this layer improves the seal between the anode second surface and the next cell component when positioned therebetween.

It should be noted that although these drawings show different structural arrangements which will minimize corrosion in the fuel cell, it is preferred that the ion impermeable layer be positioned between the anode and the cathode at the edge regions. And most preferably the layer should be positioned between the edge regions of the two electrodes over the cathode flow field inlet and outlet.

We claim:

1. A fuel cell comprising;
   a. an electrolyte, said electrolyte having an electrolyte edge region;
   b. a porous anode and a porous cathode electrode each having a substrate positioned on opposite sides of said electrolyte;
   c. wherein said anode and said cathode substrate each have a first major surface and a second opposing major surface;

d. wherein said first major surface of both the anode and the cathode have a catalyst layer situated on said first major surface and extending over all of said surface except for respective anode and cathode edge regions;

e. wherein a fuel gas flow field is present on the second major surface of the anode and an oxidant gas flow field is present on the second major surface of the cathode and each flow field has respective flow field edge regions; and f. an inlet and an outlet for the introduction and removal of said fuel gas and said oxidant gas into and out of their respective flow fields, wherein said field edge region of said respective flow field, electrolyte anode and cathode superjacent to said oxidant inlet and outlet are narrower than said edge regions positioned parallel to the oxidant flow path and wherein an ion impermeable layer is positioned between said narrow edge region of said anode and cathode.

2. The fuel cell of claim 1 wherein narrow edge regions are less than $25\mu$ in width.

3. The fuel cell of claim 1 wherein the ion impermeable layer overlaps onto a vertical outboard edge of the anode electrode.

4. The fuel cell of claim 1, wherein the thickness of said ion impermeable layer is about $10\mu$ to about $100\mu$.

5. The fuel cell of claim 1 wherein the ion impermeable layer is formed from material selected form the group consisting of polytetrafluoroethylene, polytetrafluoroethylene/perfluoroakyl vinyl ether copolymer, polyfluorinated ethylpropylene, fluoroelastomers or polyphenylene sulfide.

* * * * *